US008687039B2

(12) United States Patent　　(10) Patent No.: US 8,687,039 B2
DeGrazia et al.　　(45) Date of Patent: Apr. 1, 2014

(54) DIMINISHING AN APPEARANCE OF A DOUBLE CHIN IN VIDEO COMMUNICATIONS

(75) Inventors: Bradley Richard DeGrazia, Seattle, WA (US); Alan Darryl Gatzke, Bainbridge Island, WA (US); Matthew Kuhlke, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 312 days.

(21) Appl. No.: 13/154,030

(22) Filed: Jun. 6, 2011

(65) Prior Publication Data

US 2012/0306991 A1　Dec. 6, 2012

(51) Int. Cl.
*H04N 7/14* (2006.01)
(52) U.S. Cl.
USPC ............... 348/14.12; 348/14.08; 379/202.01; 709/201
(58) Field of Classification Search
USPC ................... 348/14.01–14.16; 370/259–271, 370/351–357; 709/201–207, 217–248
See application file for complete search history.

(56) References Cited

U.S. PATENT DOCUMENTS

| | | | |
|---|---|---|---|
| 8,345,114 B2 * | 1/2013 | Ciuc et al. | 348/222.1 |
| 2009/0231356 A1 * | 9/2009 | Barnes et al. | 345/594 |
| 2011/0090303 A1 * | 4/2011 | Wu et al. | 348/14.16 |
| 2011/0102553 A1 * | 5/2011 | Corcoran et al. | 348/50 |
| 2012/0054691 A1 * | 3/2012 | Nurmi | 715/854 |
| 2012/0081282 A1 * | 4/2012 | Chin | 345/156 |

OTHER PUBLICATIONS

"Portrait Professional Forums", http://www.portraitprofessional.com/Forum/archive/index.php?thread-697 . . . , downloaded Jun. 1, 2011, 3 pages.
"OptiML™ Face Tools", http://www.tessera.com/technoloies/imagingandoptics/Documents/OptiML_faceTools, downloaded Jun. 1, 2011, 4 pages.

* cited by examiner

*Primary Examiner* — Hemant Patel
(74) *Attorney, Agent, or Firm* — Fish & Richardson P.C.

(57) ABSTRACT

Techniques for diminishing an appearance of a participant's double chin during video conferencing. A participant's image is captured with an input device and processed so as to diminish the appearance of a double chin between the participant's chin and neck. The processed image with a diminished double chin appearance is outputted to both the participant's video conferencing graphical user interface and to the graphical user interface of a remote participant that the participant is communicating with in the video conferencing session. The diminished double chin appearance may be dynamically modified in real time during the video conference.

20 Claims, 4 Drawing Sheets

DIMINISHING AN APPEARANCE OF A DOUBLE CHIN IN VIDEO COMMUNICATIONS

TECHNICAL FIELD

The present disclosure generally relates to communication technologies for image capturing and rendering.

BACKGROUND

The growth of video communication technologies have enabled remote participants to communicate with each other in previously unknown ways. Using these video communication technologies, participants can communicate in real time with each other through sight as well as sound. For example, a participant may communicate to another participant through video conferences.

DESCRIPTION OF EXAMPLE EMBODIMENTS

Overview

In one general aspect, the appearance of a participant's double chin in a video conference may be reduced through a method that includes: analyzing at least one image frame within the video conference and identifying visual characteristics within the analyzed image frame that correspond to a face of a participant, and discerning characteristics of the image frame related to a chin region, determining whether stored information related to the appearance of the chin of the participant is accessible. Based on determining that the stored information related to the appearance of the chin of the participant is accessible, accessing the information related to the appearance of the chin of the participant. Responsive to determining that the stored information related to the appearance of the chin of the participant is not accessible, facilitating creation of a user profile for the participant, facilitating storage of information in the created user profile related to the appearance of the chin of the participant, enabling displaying of information related to the appearance of the chin of the participant to permit the participant to view the appearance of the chin in a graphical user interface (GUI) and adjust visual characteristics of the appearance of the chin, receiving information based on the participant's interactions with the GUI regarding the adjustment of the visual characteristics of the appearance of the chin, adjusting the visual characteristics of the chin using the information received based on participant's interactions with the graphical user interface, and enabling, on the graphical user interface, display of the appearance of the chin with the adjusted visual characteristics of the chin.

In another general aspect, the appearance of a participant's double chin in a video conference may be reduced through a method that includes: identifying a face of a participant of a video conference, accessing a database configured to store information related to a facial recognition of a participant, and determining whether the identified face is a face that has information related to the facial recognition stored in the database. Based upon determining that the identified face has information related to the facial recognition in the database, retrieving the information related to the facial recognition in the database to identify an appearance of a chin on the face of the participant, identifying an appearance of a chin on the face of the participant using the retrieved information, adjusting the appearance of the chin of the participant using the information related to the facial recognition, and storing information in the database related to the adjusted appearance of the chin of the participant. Based upon determining that the identified face does not have information related to the facial recognition in the database, performing facial recognition on the identified face of the participant, identifying an appearance of a chin on the face of the participant using the performed facial recognition, adjusting the appearance of the chin of the participant, and storing information in the database related to the adjusted appearance of the chin of the participant and the facial recognition performed.

Details of one or more implementations are set forth in the accompanying drawings and the description herein. Other features and aspects will be apparent from the description, the drawings, and the claims.

DETAILED DESCRIPTION

In video conferencing applications, a graphical user interface (GUI) displays a user's image to a remote user for which the user (e.g., participant) of the GUI can communicate. In some cases the participant can remove certain features from their face in order to present a more appealing real-time video image to the remote participant. One such feature is the presence of fat and/or aging marks located between the participant's chin and neck, also known as a "double chin". The "double chin" may also be areas of the face below the mouth that may have multiple shaded areas, some of which may depend on the ambient lighting around the participant during the video conference, and some of which may be a facial position or various physical features of the participant. Such features may become more pronounced through use of mobile communication devices, such as tablet and/or mobile phone devices, because of the wide angled lenses used in these devices and because of the different angles that a participant may hold these devices at when conducting communications.

Instead of allowing an unaltered video image to be sent to the remote participant's GUI, a participant may, through their own GUI, apply implementations that diminish the appearance of the double chin feature on their face. The implementations may be set to default conditions that are configured upon the participant's first use of the application. The participant may choose among several different implementations to reduce the appearance of the double chin in the video conference. For example the participant may choose to lighten the region around their double chin area, darken the region around their double chin, shade and/or blur the region around their double chin area.

Once an implementation for reducing a double chin has been selected, the participant's image processing system may apply the implementation onto the participant's face captured during any video conferencing session so that the participant's image displayed on the remote participant's GUI shows a diminished appearance of the participant's double chin. The participant's diminished double chin appearance may also be displayed on any secondary preview window that may exist on the participant's own GUI that gives the user feedback on their image displayed on the remote participant's GUI.

Figure 1A:
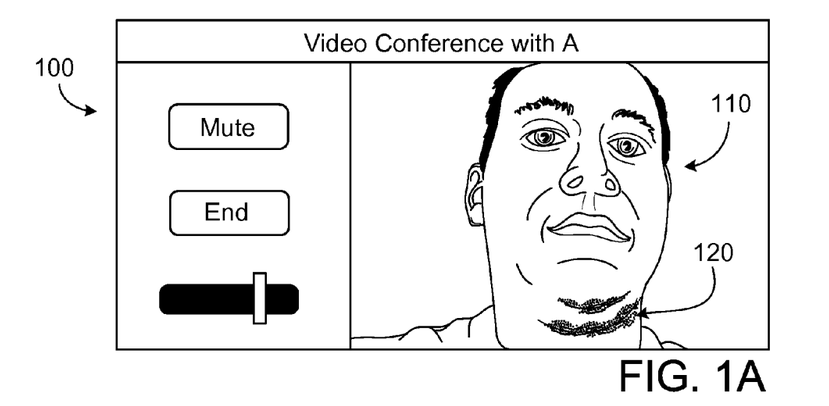
FIGS. 1A, 1B and 1C illustrate an example of a graphical user interface where an appearance of a double chin in a video conference is diminished.

FIG. 1A shows a video conferencing GUI 100 as seen from the perspective of a remote participant. The GUI 100 is configured to visually output a participant's image 110. Among other features, the participant's image displays the presence of a double chin 120 on the participant's face. The appearance of the double chin 120 on the participant's face is an unaltered video image, before image processing is used to diminish the appearance of the double chin.

Figure 1B:
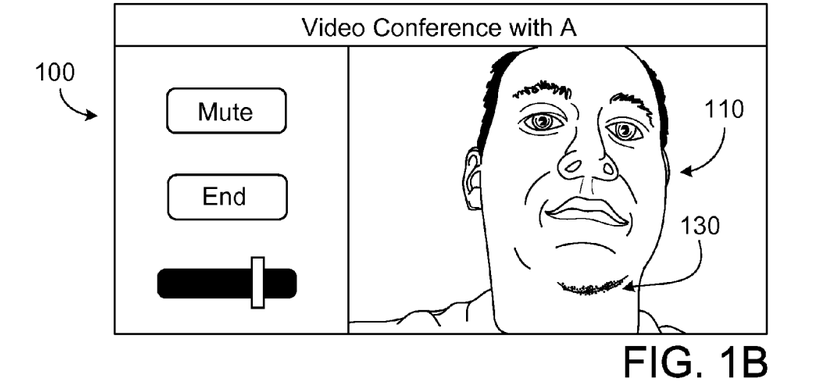

FIG. 1B shows an implementation, where instead of outputting the participant's image 110 with a double chin 120 as in FIG. 1A, the GUI 100 outputs the participant's video image 110 with the appearance of a diminished double chin 130. The appearance of the diminished double chin 130 is achieved through the use image processing configured to altered and/or lighten the area around the double chin in the video conference.

Figure 1C:
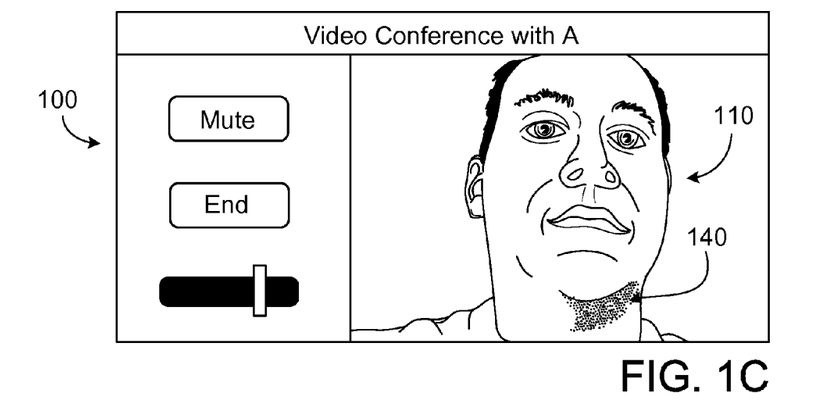

FIG. 1C shows an implementation, where instead of outputting the participant's image 110 with a double chin 120 as in FIG. 1A, the GUI 100 outputs the participant's image 110 with an appearance of the diminished double chin 140. The appearance of the diminished double chin is achieved through the participant of image processing that is configured to alter and/or darken the area around the double chin in the video conference.

Figure 2:
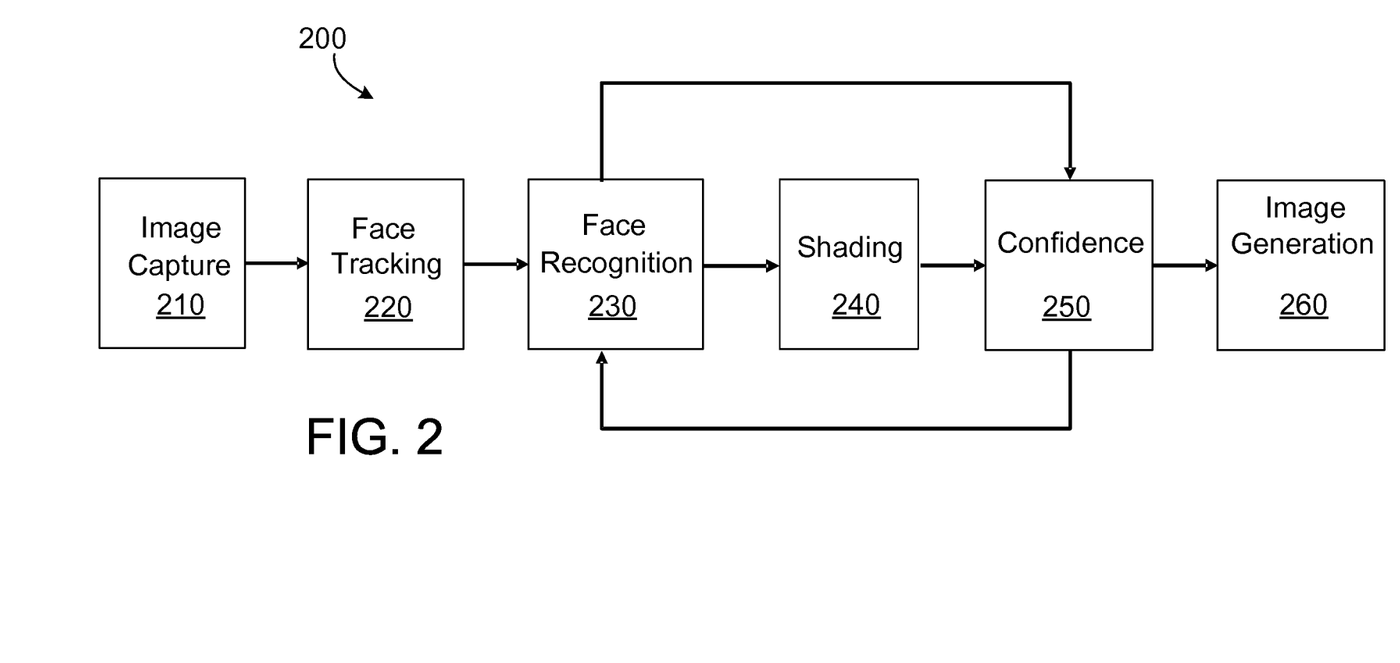
FIG. 2 illustrates an example of an image processing system for diminishing an appearance of a double chin in the video conference.

FIG. 2 shows an example of an image processing system 200 for diminishing an appearance of a double chin in the video conference. The image processing system may be configured from a combination of connected modules. These modules may be configured using one or more electronic devices with software running on at least one electronic device having at least one processor and at least one storage medium, or a combination thereof.

The image processing system 200 includes an image capture module 210 having an output coupled to an input of a face tracking module 220. The face tracking module 220 has an output coupled to an input of a face recognition module 230. The face recognition module 230 has an output that is coupled to an input of a shading module 240 and to an input of a confidence module 250. The shading module has an output that is coupled to an input of a confidence module 250. The confidence module 250 has an output coupled to an input of the face recognition module 230 and an output coupled to the input of the image generation module 260. In some implementations, the order, arrangement, or connections of the modules 210, 220, 230, 240, 250, 260 may vary from what is shown in FIG. 2.

In order to generate data for diminishing the appearance of the participant's double chin, the participant's video image is inputted into the processing system 200 through the image capture module 210. The image capture module 210 generates data related to the participant's facial features, and then sends the captured participant image to the face tracking module 220. The face tracking module 220 is configured to track the face of the participant in the captured image by identifying features of the participant's face, such as the chin, nose and eyes. The face tracking module 220 sends the captured image, along with tracking information, to the face recognition module 230. The face recognition module 230 determines, through assessing a database, if the features of the face match with those of a participant's profile stored in a database. The face recognition module 230 also may determine the location of the double chin through using the features of the participants face and by assessing color differences in this location. The face recognition module 230 sends the captured image along with the location of participant's double chin in the image, to a shading module 240. The shading module 240 applies the participant's choice of shading algorithms onto the double chin feature and sends the image with the shaded image double chin to the confidence module 250. The confidence module 250 determines if the image has been processed properly by determining if essential features (e.g., mouth, nose, chin) of the participant's face are still present after application of the shading techniques. If the image is found to have missing features, the confidence module 250 requests the face recognition module 230 to reprocess the image. If the image is found to have all essential features, the confidence module 250 sends the image to the image generation module 260, which facilitates the output of the processed image to a GUI.

Any of the modules may generate data to store in a database for the participant. The data generated by any of the modules may be associated with information for the user's profile, which may be stored in the database, whether locally on the device the participant is using or some other remote database, such as a cloud database. If the participant does not have a user profile created, then the system of FIG. 2 can create a user profile to associate with the participant. In some implementations, data for or from the user profile may be used whenever the participant uses the video conferencing system. In some implementations, information may be generated for a user profile and the information for the user profile is retrieved and utilized when the participant uses the video conferencing system. In other implementations, the information of the user profile may be dynamically updated in the same video conference (e.g., updated as a participant moves between various lighting or shading conditions in the video conference) or among various video conferencing sessions with the participant.

The face tracking module 220 may determine, for each frame of a captured image, where major features of a face are located in an image, thus allowing for dynamic processing of images. These major features can include at least one of the chin, the nose, the eyes, the ears, the nostrils and the lips. For example, if 30 frames of an image are inputted through the image capture module 210, the chin, nose and eyes of a face may be identified by the face tracking module 220 for each of the 30 frames.

In some implementations, the face recognition module 230 takes an image frame, with the information on the location of the major facial features, stores it in an electronic storage and determines if the face in the frame corresponds to a participant in a database. This determination may be achieved by comparing major features of the participant's face with those stored in the database, either through parsing through a lookup table, or through use of an image comparing search function. If a match is not determined, the face recognition module 230 may initiate a new user profile to create a profile in the database through communications with the participant's GUI. Once a match has been determined, either through an existing participant, or through a new participant entering their information into the database via their GUI, the face recognition module 230 may also determine the location of an appearance of the double chin on the face in the video image. The location of the appearance of the double chin may be determined by the facial recognition module 230 applying a feature searching algorithm to look for thresholds of color variations below the chin that match with predictive color and/or lighting variations found around a double chin.

The shading module 240 takes the image frame, along with the location of the double chin, and applies a shading algorithm to the double chin region. The shading algorithm may lighten, darken and/or blur the double chin as per a participant's setting, where the face is that of the participant. The participant's profile may be set upon the participant first setting up the video conferencing system, and/or may be done in real time with the participant adjusting shading parameters during a video conferencing session.

The confidence module 250 takes the shaded image and determines if the image still contains the major facial features identified during face tracking. If the confidence module 250 does not find these features, the confidence module 250 sends a request to the face recognition module 230 to re-process the video frame again with an indication of which attempt the frame is on for re-processing. If the confidence module 250 determines that the frame has gone through a certain number of attempts and still fails to display the required facial features, the confidence module 250 may pass on the original frame stored in the face recognition module 230, to the image generation module 260. If the shaded frame does include the major facial features, then the confidence module 250 may pass the frame with the appearance of the diminished double chin to the image generation module 260.

The image generation module 260 may be configured to output an image frame to the participant on their GUI. The image generation module 260 module 260 may also be configured to output an image frame to a remote participant, for display on the remote participant's GUI. The image generation module 260 may connect with any number of communication connections that allow for the passing of these images across a network and/or to a GUI.

Figure 3:
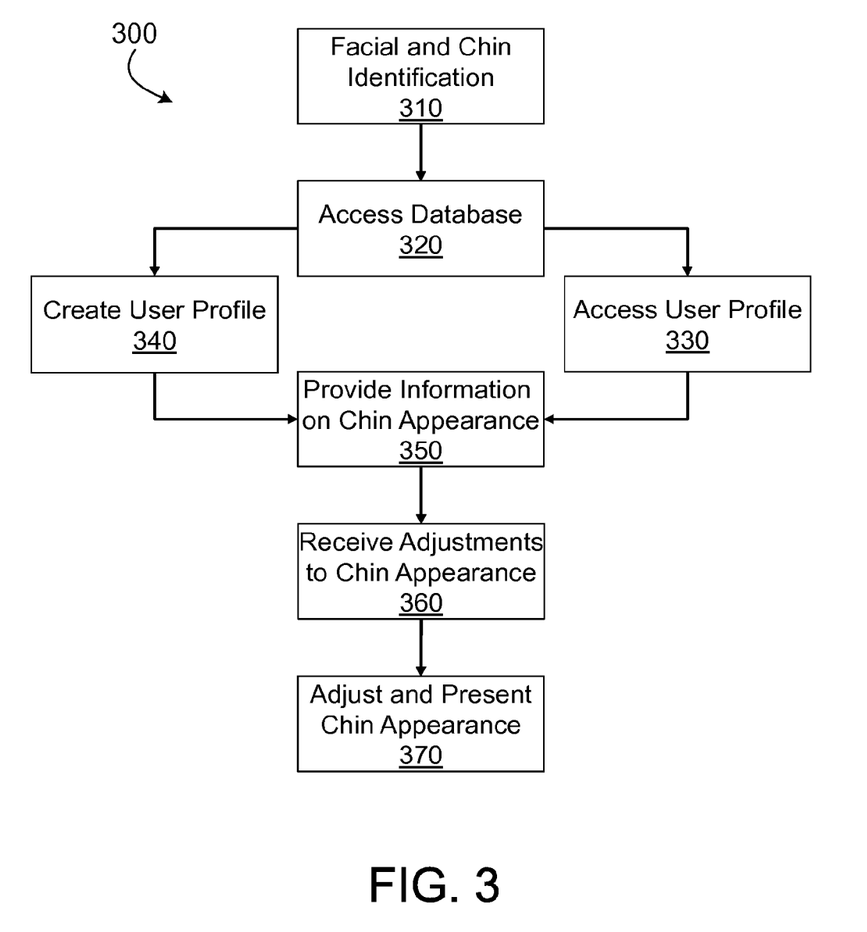
FIG. 3 illustrates an example of a process flow chart by which an appearance of a double chin in the video conference can be detected and diminished.

FIG. 3 illustrates an example of a process flow chart 300 by which an appearance of a double chin in the video conference can be detected and diminished. Generally, the operations shown in FIG. 3 may be performed on the image processing system described in FIG. 2. However, the operations may be implemented and performed on other devices in other configurations.

In FIG. 3, data for a participant's face is inputted and identified (at 310) including identification of the participant's chin. A database is accessed (at 320) to determine whether there is information stored in the database related to the appearance of the chin. The information stored in the database may be comprised of user profiles with facial recognition information related to the user profiles. A user's profile may be accessed (at 330) based on a determination that there is information stored in the database related to the appearance of the chin of the participant. A new user profile may be created (at 340) based on a determination that there is not information stored in the database related to the appearance of the chin of the participant. The process of creating a new user profile may include creating a user profile in the database and storing information in the created profile related to the appearance of the chin of the participant.

Stored information related to the appearance of the participants chin is provided to a GUI (at 350). The participant may view the appearance of their chin in the GUI and also may be permitted in the GUI to adjust the visual characteristics of the appearance of the chin. Information regarding adjustments to the visual characteristics of the appearance of the chin are received (at 360) from the GUI. Based on the received information from the GUI the visual characteristics of the chin are adjusted and presented (at 370) in the GUI.

The features shown in FIGS. 2 and 3 may be implemented in a different method. For example, a method for removing an appearance of a double chin feature on a participant of a video conference involves identifying a face of a participant of a video conference, identifying an appearance of a chin on the participant, and assessing a database to determine whether there is information stored in the database related to the appearance of the chin of the participant, where the database includes user profiles with facial recognition information related to the user profiles. Based on determining that there is information stored in the database related to the appearance of the chin of the participant, the method involves accessing the information related to the appearance of the chin of the participant. Based on determining that there is not information stored in the database related to the appearance of the chin of the participant, the method involves creating a user profile in the database for the participant, and storing information in the created user profile that is related to the appearance of the chin of the participant. The method also involves providing the information, to a graphical user interface, that is related to the appearance of the chin of the participant to permit the participant to view the appearance of the chin in the graphical user interface and adjust visual characteristics of the appearance of the chin, receiving information from the graphical user interface regarding the adjustment of the visual characteristics of the appearance of the chin, adjusting the visual characteristics of the chin based on the received information from the graphical user interface, and presenting, to the graphical user interface, the adjusted visual characteristics of the appearance of the chin.

Some techniques for identifying the appearance of the double chin can include identifying a nose on the face and identifying a chin on the face. The system can track a movement of the chin on the face. Other variations of the features shown in FIGS. 2 and 3 may involve determining an appearance of a double chin by determining an amount of shading of the appearance of the chin, determining whether the amount of shading exceeds a predetermined threshold amount of shading of the appearance of the chin, and based upon determining that the amount of shading exceeds the predetermined threshold amount of shading, generating information to indicate there is an appearance of the double chin. Based upon determining that the amount of shading does not exceed the predetermined threshold amount of shading, there can be information generated to indicate that there is not an appearance of the double chin. Based upon the generated information and the determined amount of shading, there can be dynamic tuning of the visual characteristics of the appearance of the chin based on the amount of shading of the chin.

In some implementations, the system can provide information on a graphical user interface related to a display of a view of the face of the participant prior to adjusting the visual characteristics of the chin (e.g., a preview window). Some features shown in FIG. 3 may involve determining whether the identified face of the participant matches a face of a participant stored in one of the user profiles in the database by searching the user profiles in the database to determine that the identified face matches at least one of the user profiles with a predetermined confidence level. Other features may involve tracking the identified face, and dynamically adjusting the visual characteristics of the chin based on the tracking of the identified face, where the dynamic adjustment can involve adjusting at least one of a blurring of the chin, a shading of the chin, a lighting of the chin, and a darkening of the chin to match the adjusted visual characteristics that were generated by the participant in the graphical user interface. The features shown in FIGS. 2 and 3 may be implemented in another method. For instance, there is a method for removing an appearance of a double chin feature on a participant of a video conference that involves identifying a face of a participant of a video conference, accessing a database configured to store information related to a facial recognition of a participant, and determining whether the identified face is a face that has information related to the facial recognition stored in the database. The method also involves, based upon determining that the identified face has information related to the facial recognition in the database, retrieving the information related to the facial recognition in the database to identify an appearance of a chin on the face of the participant, identifying an appearance of a chin on the face of the participant using the retrieved information, adjusting the appearance of the chin of the participant using the information related to the facial recognition, and storing information in the database related to the adjusted appearance of the chin of the participant. The method also involves, and based upon determining that the identified face does not have information related to the facial recognition in the database, performing facial recognition on the identified face of the participant; identifying an appearance of a chin on the face of the participant using the performed facial recognition; adjusting the appearance of the chin of the participant, and storing information in the database related to the adjusted appearance of the chin of the participant and the facial recognition performed. The features for adjusting the appearance of the chin involves at least one of a blurring of the chin, a shading of the chin, a lighting of the chin, and a darkening of the chin.

Figure 4:
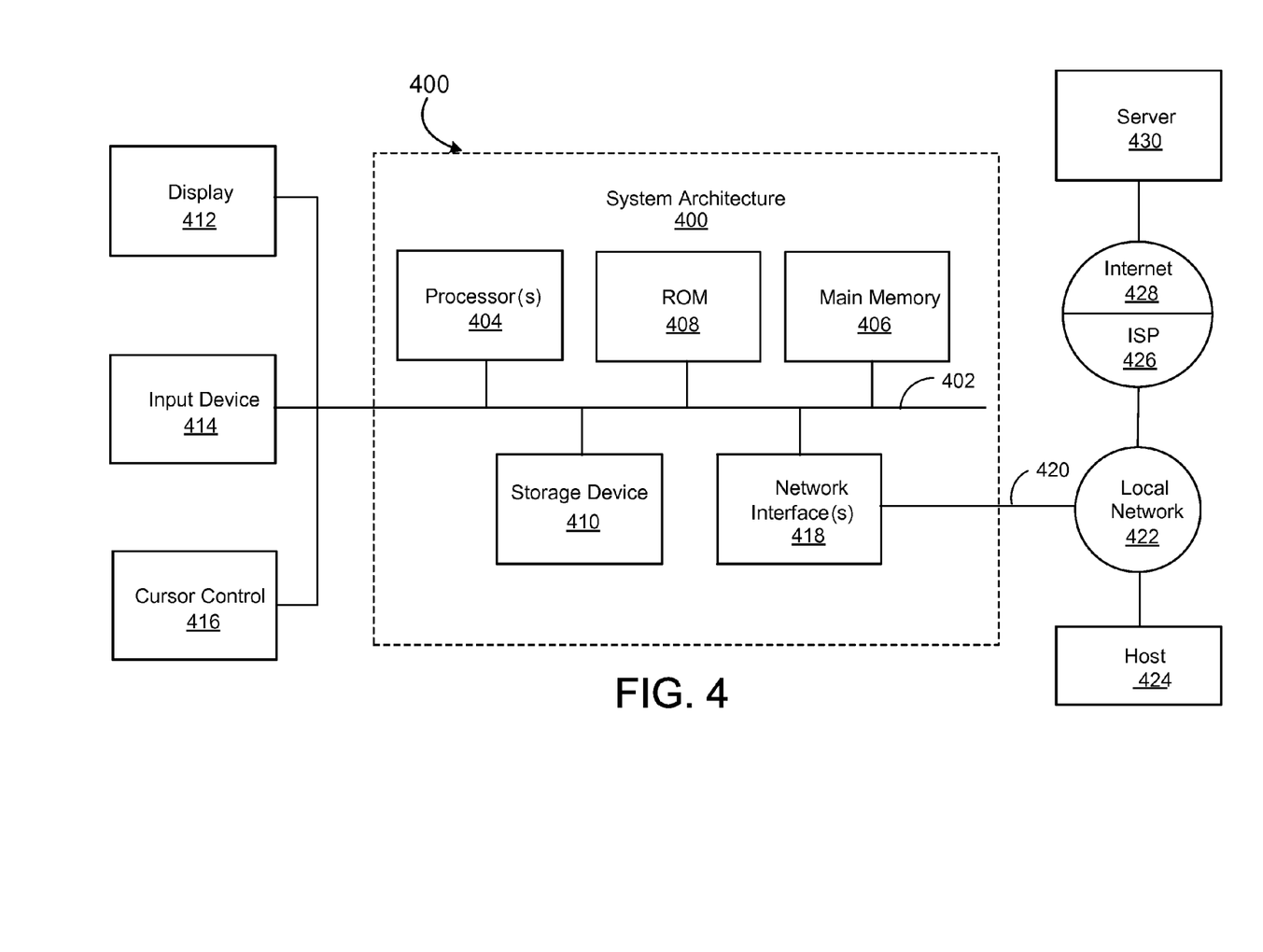
FIG. 4 illustrates an example of a communication system for diminishing an appearance of a double chin in the video conference.

FIG. 4 shows an implementation of a system architecture 400 that may implement the system in FIG. 2 and the process flow in FIG. 3. The system architecture 400 may contain at least processor 404 element, a read only memory (ROM) 408 element and a main memory 406 element. In addition, the system architecture 400 can include a storage device 410 element and at least one network interface 418 element. An input/output (I/O) bus 402 may serve to connect all of the elements of system architecture 400 together.

Peripheral elements may be connected to the system architecture 400 via the (I/O) bus 402. In particular, a display 412 element, an input device 414 element and a cursor control 416 element may be connected to (I/O) bus 402. The input device 414 may include various types of image capturing devices such as webcams, digital cameras and video cameras. The input device 414 may be positioned in the X,Y and Z direction so as to capture an image at an angle (e.g., positioned so as to face underneath the chin of the participant, such as a camera on a tablet or phone).

Through the at least one network interface 418, a network connection 420 connects the system architecture 400 with a local network 422. The local network 422 is itself connected to a host 424 and an internet service provider 426 and the Internet 428. Through the Internet 428, a connection may be made to at least one server 430 element.

The disclosed and other embodiments can be implemented as one or more computer program products, i.e., one or more modules of computer program instructions encoded on a computer readable medium for execution by, or to control the operation of, data processing apparatus. The one or more modules may be implemented in hardware. The computer readable medium can be a machine-readable storage device, a machine-readable storage substrate, a memory device, or a combination of one or more them. The term "data processing apparatus" may encompass an apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, multi-core processors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include various forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. Some storage devices may be cloud-based storage devices. The processor and the memory can be supplemented by, or incorporated in, special purpose logic circuitry. The computer may be implemented in a personal computer (PC), a tablet, a portable electronic device, a cell phone (e.g., a smart phone), or some as part of other electronic device that enables the participant to view and edit video content.

To provide for interaction with a participant, some implementations of the subject matter described in this specification can be implemented on a computer having a display device, e.g., a CRT (cathode ray tube), LCD (liquid crystal display), LED (light emitting diode), plasma display monitor, an organic display module, etc. for displaying information to the participant and a keyboard and a selector, e.g., a pointing device, a mouse, or a trackball, a touch sensor, by which the participant can provide input to the computer. Other kinds of devices can be used to provide for interaction with a participant as well; for example, feedback provided to the participant can be any form of sensory feedback, e.g., visual feedback, auditory feedback, or tactile feedback; and input from the participant can be received in any form, including acoustic, speech, or tactile input.

While this document contains many specifics, these should not be construed as limitations on the scope that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for modifying a video conference image to reduce a double chin characteristic otherwise apparent in the video conference image, the method comprising:
   during a video conference, analyzing at least one image frame within the video conference and identifying visual characteristics within the analyzed image frame that correspond to a face of a participant in the video conference;
   discerning characteristics of the image frame related to a chin region of the participant;
   determining that a double chin is present by determining that an amount of shading of the appearance of the chin exceeds a predetermined threshold amount of shading of the appearance of the chin; and
   based on determining that a double chin is present, enabling, on a graphical user interface, display of information related to the appearance of the chin of the participant to permit the participant to view the appearance of the chin in the graphical user interface and adjust visual characteristics of the appearance of the chin,
   receiving information based on participant's interactions with the graphical user interface regarding the adjustment of the visual characteristics of the appearance of the chin,
   adjusting the visual characteristics of the chin using the information received based on the participant's interactions with the graphical user interface, and
   enabling, on the graphical user interface, display of the appearance of the chin with the adjusted visual characteristics of the chin.

2. The method of claim 1, further comprising:
   identifying the appearance of the chin comprising:
      identifying a nose on the face, and
      identifying a chin on the face; and
   further comprising tracking a movement of the chin on the face.

3. The method of claim 1, further comprising:
   determining whether stored information related to the appearance of the chin of the participant is accessible;
   based on determining that the stored information related to the appearance of the chin of the participant is accessible, accessing the information related to the appearance of the chin of the participant;
   responsive to determining that the stored information related to the appearance of the chin of the participant is not accessible,
      facilitating creation of a user profile for the participant; and
      facilitating storage of information in the created user profile related to the appearance of the chin of the participant.

4. The method of claim 1, further comprising:
   based upon determining that the amount of shading exceeds the predetermined threshold amount of shading, generating information to indicate there is an appearance of the double chin; and
   based upon the generated information and the determined amount of shading, dynamically tuning the visual characteristics of the appearance of the chin based on the amount of shading of the chin.

5. The method of claim 1, further comprising storing information for the adjusted visual characteristics of the chin in the database, wherein the information for the adjusted visual characteristics of the chin in the database is associated with the participant.

6. The method of claim 1, further comprising providing information on a graphical user interface related to a display of a view of the face of the participant prior to adjusting the visual characteristics of the chin.

7. The method of claim 3, further comprising determining whether the identified face of the participant matches a face of a participant stored in one of the user profiles in the database by searching the user profiles in the database to determine that the identified face matches at least one of the user profiles with a predetermined confidence level.

8. The method of claim 1, further comprising:
   tracking the identified face; and
   dynamically adjusting the visual characteristics of the chin based on the tracking of the identified face.

9. The method of claim 8, wherein the dynamic adjustment comprises adjusting at least one of a blurring of the chin, a shading of the chin, a lighting of the chin, and a darkening of the chin to match the adjusted visual characteristics that were generated by the participant in the graphical user interface.

10. The method of claim 1, further comprising:
    performing facial recognition of the participant; and
    storing information related to the facial recognition of the participant in a user profile.

11. The method of claim 1, wherein the visual characteristics of the chin comprises at least one of a shading condition and a lighting condition of the chin.

12. The method of claim 1, wherein adjusting the visual characteristics of the chin using the information received based on the participant's interactions with the graphical user interface includes at least one of a blurring of the chin, a shading of the chin, a lighting of the chin, and a darkening of the chin.

13. A method for removing an appearance of a double chin feature on a participant of a video conference, the method comprising:
    identifying a face of a participant of a video conference;
    accessing a database configured to store information related to a facial recognition of a participant;

determining whether the identified face is a face that has information related to the facial recognition stored in the database;

based upon determining that the identified face has information related to the facial recognition in the database, retrieving the information related to the facial recognition in the database to identify an appearance of a chin on the face of the participant, identifying an appearance of a chin on the face of the participant using the retrieved information, determining that a double chin is present by determining that an amount of shading of the appearance of the chin exceeds a predetermined threshold amount of shading of the appearance of the chin, based on determining that a double chin is present, adjusting the appearance of the chin of the participant using the information related to the facial recognition, wherein the adjusting the appearance of the chin comprises at least one of a blurring of the chin, a shading of the chin, a lighting of the chin, and a darkening of the chin, and storing information in the database related to the adjusted appearance of the chin of the participant; and based upon determining that the identified face does not have information related to the facial recognition in the database, performing facial recognition on the identified face of the participant, identifying an appearance of a chin on the face of the participant using the performed facial recognition, determining that a double chin is present by determining that an amount of shading of the appearance of the chin exceeds a predetermined threshold amount of shading of the appearance of the chin, based on determining that a double chin is present, adjusting the appearance of the chin of the participant, wherein the adjusting the appearance of the chin comprises at least one of a blurring of the chin, a shading of the chin, a lighting of the chin, and a darkening of the chin, and storing information in the database related to the adjusted appearance of the chin of the participant and the facial recognition performed.

14. The method of claim 13, wherein the identifying the appearance of the chin comprises:
identifying a nose on the face, and
identifying a chin on the face; and
further comprises tracking a movement of the chin on the face.

15. A non-transitory computer readable medium storing software comprising instructions for removing an appearance of a double chin feature on a participant of a video conference, the instructions that when executed on a processor cause the processor to perform operations that include:

during a video conference, analyzing at least one image frame within the video conference and identifying visual characteristics within the analyzed image frame that correspond to a face of a participant in the video conference;

discerning characteristics of the image frame related to a chin region of the participant;

determining that a double chin is present by determining that an amount of shading of the appearance of the chin exceeds a predetermined threshold amount of shading of the appearance of the chin; and based on determining that a double chin is present, enabling, on a graphical user interface, display of information related to the appearance of the chin of the participant to permit the participant to view the appearance of the chin in the graphical user interface and adjust visual characteristics of the appearance of the chin, receiving information based on participant's interactions with the graphical user interface regarding the adjustment of the visual characteristics of the appearance of the chin, adjusting the visual characteristics of the chin using the information received based on the participant's interactions with the graphical user interface, and enabling, on the graphical user interface, display of the appearance of the chin with the adjusted visual characteristics of the chin.

16. The non-transitory computer readable medium of claim 15, further comprising instructions to:
identifying the appearance of the chin comprising:
identifying a nose on the face, and
identifying a chin on the face; and
further comprising tracking a movement of the chin on the face.

17. A non-transitory computer readable medium storing software comprising instructions for removing an appearance of a double chin feature on a participant of a video conference, the instructions that when executed on a processor cause the processor to perform operations that include:

identifying a face of a participant of a video conference;

accessing a database configured to store information related to a facial recognition of a participant;

determining whether the identified face is a face that has information related to the facial recognition stored in the database;

based upon determining that the identified face has information related to the facial recognition in the database, retrieving the information related to the facial recognition in the database to identify an appearance of a chin on the face of the participant, identifying an appearance of a chin on the face of the participant using the retrieved information, determining that a double chin is present by determining that an amount of shading of the appearance of the chin exceeds a predetermined threshold amount of shading of the appearance of the chin, based on determining that a double chin is present, adjusting the appearance of the chin of the participant using the information related to the facial recognition, wherein the adjusting the appearance of the chin comprises at least one of a blurring of the chin, a shading of the chin, a lighting of the chin, and a darkening of the chin, and storing information in the database related to the adjusted appearance of the chin of the participant; and based upon determining that the identified face does not have information related to the facial recognition in the database, performing facial recognition on the identified face of the participant, identifying an appearance of a chin on the face of the participant using the performed facial recognition, determining that a double chin is present by determining that an amount of shading of the appearance of the chin exceeds a predetermined threshold amount of shading of the appearance of the chin, based on determining that a double chin is present, adjusting the appearance of the chin of the participant, wherein the adjusting the appearance of the chin comprises at least one of a blurring of the chin, a shading of the chin, a lighting of the chin, and a darkening of the chin, and storing information in the database related to the adjusted appearance of the chin of the participant and the facial recognition performed.

18. The non-transitory computer readable medium of claim 17, wherein the instructions identifying the appearance of the chin comprises:
    identifying a nose on the face, and
    identifying a chin on the face; and
    further comprises tracking a movement of the chin on the face.

19. A system for removing an appearance of a double chin feature on a participant of a video conference, the system comprising:
    a face tracking module configured to identify a face of a participant of a video conference;
    a face recognition module, connected to the face tracking module and a graphic user interface (GUI), configured to:
        identify an appearance of a chin on the participant;
        determining that a double chin is present by determining that an amount of shading of the appearance of the chin exceeds a predetermined threshold amount of shading of the appearance of the chin;
        based upon determining that the amount of shading exceeds the predetermined threshold amount of shading, generating information to indicate there is an appearance of the double chin;
        assess a database to determine whether there is information stored in the database related to the appearance of the chin of the participant, wherein the database comprises user profiles with facial recognition information related to the user profiles;
        based on determining that there is information stored in the database related to the appearance of the chin of the participant, access the information related to the appearance of the chin of the participant;
        based on determining that there is not information stored in the database related to the appearance of the chin of the participant,
            create a user profile in the database for the participant, and
            store information in the created user profile that is related to the appearance of the chin of the participant;
        provide the information, to the GUI, that is related to the appearance of the chin of the participant;
    the GUI configured to:
        present the appearance of the chin,
        receive information to adjust visual characteristics of the appearance of the chin to send information to the face recognition module regarding the adjustment of the visual characteristics of the appearance of the chin, and
        present the adjusted visual characteristics of the appearance of the chin; and
    the shading module configured to adjust the visual characteristics of the chin based on the presented adjustment information for the visual characteristics of the appearance of the chin.

20. The system of claim 19, wherein the identifying the appearance of the chin in the face recognition module comprises:
    identifying a nose on the face, and
    identifying a chin on the face.

* * * * *